Jan. 30, 1968

P. J. NIELAND ET AL 3,366,342

RECORDING CARRIER HANDLING MACHINE

Filed Dec. 16, 1964

INVENTORS
PAUL J. NIELAND
WILLIAM R. RASMUSSEN JR.
BY Merchant, Merchant + Gould
ATTORNEYS

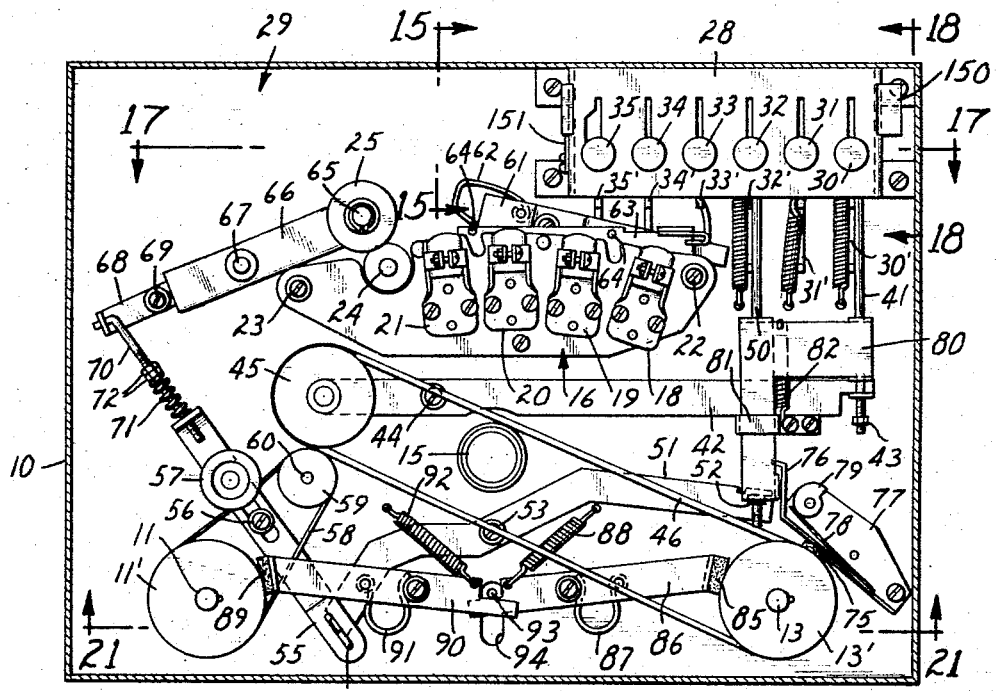

INVENTORS
PAUL J. NIELAND
WILLIAM R. RASMUSSEN JR
BY Merchant, Merchant + Gould
ATTORNEYS Jan. 30, 1968 P. J. NIELAND ET AL 3,366,342
RECORDING CARRIER HANDLING MACHINE
Filed Dec. 16, 1964 9 Sheets-Sheet 5

INVENTORS
PAUL J. NIELAND
WILLIAM R. RASMUSSEN JR.
BY Merchant, Merchant & Gould
ATTORNEYS INVENTORS
PAUL J. NIELAND
WILLIAM R. RASMUSSEN JR.
BY Merchant, Merchant & Gould
ATTORNEYS

INVENTORS
PAUL J. NIELAND
WILLIAM R. RASMUSSEN
ATTORNEYS

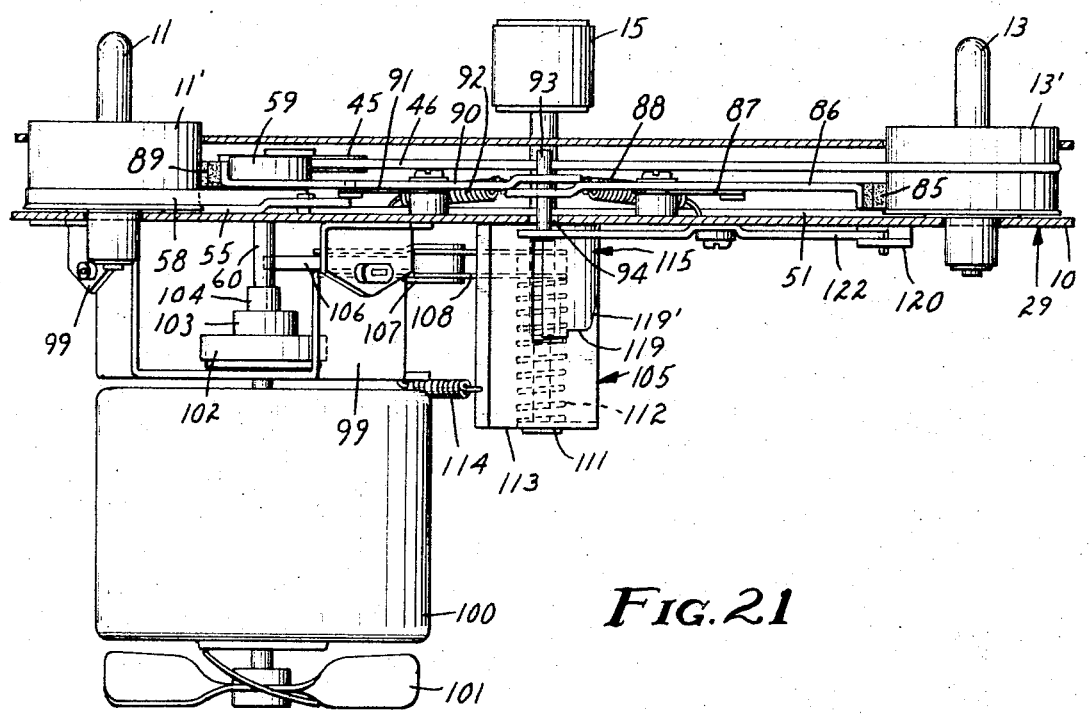
FIG. 21
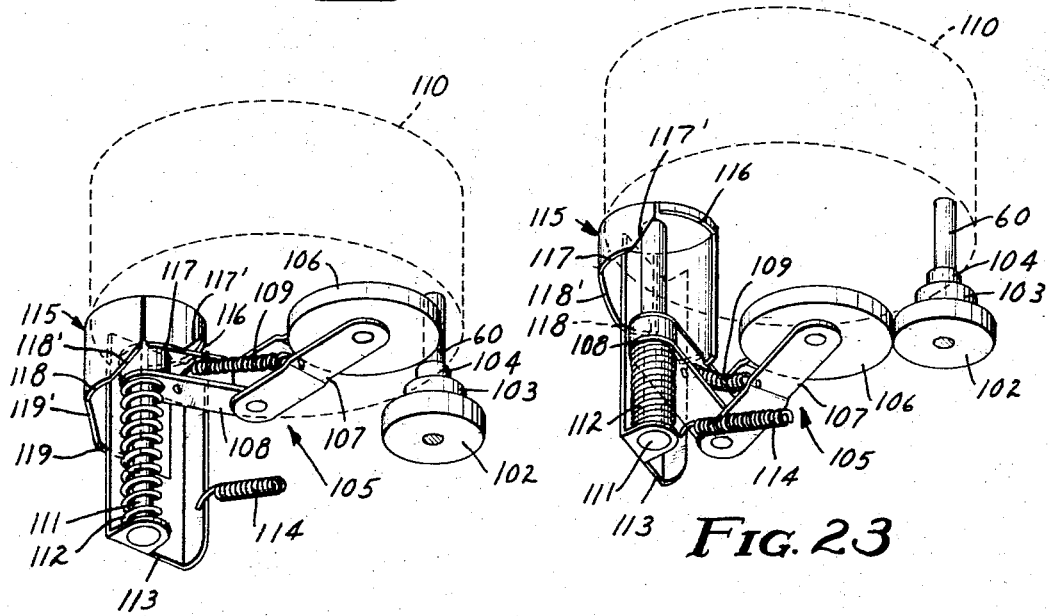
FIG. 22
FIG. 23
INVENTORS
PAUL J. NIELAND
WILLIAM R. RASMUSSEN JR
BY Merchant, Merchant & Gould
ATTORNEYS

United States Patent Office 3,366,342
Patented Jan. 30, 1968

3,366,342
RECORDING CARRIER HANDLING MACHINE
Paul J. Nieland, South St. Paul, and William R. Rasmussen, Jr., Minneapolis, Minn., assignors to Viking of Minneapolis, Inc., Minneapolis, Minn., a corporation of Minnesota
Filed Dec. 16, 1964, Ser. No. 418,817
4 Claims. (Cl. 242—55.12)

This invention pertains to apparatus for recording and playback of audio signals on a recording carrier such as magnetic tape and more particularly to apparatus for controlling the speed and direction of movement of the recording carrier.

In prior art devices when it is desired to change the speed of the recording carrier either the speed of the motor driving the capstan is changed electrically, which is very expensive and complicated, or the diameter of the capstan is changed by means of a sleeve which is manually placed over the top of the capstan. Placing the sleeve over the top of the capstan is a tedious and time consuming chore which greatly limits the speed changing ability of an operator of the recording carrier handling machine. Also, either changing the speed of the motor electrically or placing a sleeve over the capstan greatly limits the number of different speeds at which the recording carrier handling machine can operate.

In prior art devices the mechanical controls for rewinding the recording carrier, fast forward winding the carrier, recording and playback are either one single control or a plurality of controls located all about the apparatus and in no particular order. If all of the various operations of the prior art apparatus are controlled by one control there is a great disadvantage in that the operator must switch the control through various operations to reach the desired operation. Thus, for example to reach the record position the operator must turn the control through possibly the fast forward operation. In this case a large quantity of tape will be rolled onto the takeup reel from the supply reel before the record operation has begun. Also, there is a possibility that the switch can be turned to the record position when the playback position is actually desired, thereby, erasing a large quantity of valuable recording. In prior art apparatus having a plurality of controls located about the apparatus in various positions a great deal of time and effort is required to learn the position of each of the various controls and to be sure that they are well in mind so the operator may handily change to the various operations during use of the apparatus.

In the present invention the control to change the speed of the capstan and, thus, the speed of the recording carrier past the various transducers is changed by a single control located centrally on the apparatus. The centrally located control changes the driving ratio between a motive means, which in this case is an electric motor, and the capstan. The electric motor has a plurality of driving wheels, each having a different radius, fixedly mounted on its shaft and the central control moves an idler wheel so that it is in engagement with the capstan and the desired driving wheel to provide the desired speed of the capstan.

A plurality of similar controls or actuators which place the apparatus in the different modes of operation are physically located in close proximity on a control panel. Each of the mechanical switches or actuators is mounted for movement parallel to the movement of all the other actuators and has a protruding portion thereon which engages with a locking bar when the actuator is moved from its normal or spring biased position to the position in which a desired operation takes place. The locking bar is disengaged from the protruding portion of the actuator when a stop switch or arrester is moved from its normal position to its operating position. In addition a locking mechanism prevents the apparatus from being changed to a different mode of operation without moving the arrester to the operating position first. Also, the apparatus is placed in the record mode only when two predetermined actuators are placed in their operating positions simultaneously.

Thus, because all of the mechanical switches or actuators are located together in a small area on the face of the apparatus it is relatively simple to determine the desired mode of operation and to find the correct actuator and move it to provide that mode. Also, since separate actuators are used for each operation, such as rewind, fast forward, playback and record, and since the playback and record actuators must be moved to the operating position simultaneously to place the apparatus in the record operation no recording carrier or valuable records will be used or destroyed while manipulating the controls. It is also convenient and easy to change speeds while the apparatus is in operation by simply turning the centrally located speed control switch to the desired speed.

It is an object of this invention to provide improved control apparatus for a record/playback device.

It is another object of this invention to provide an improved speed control apparatus for a record/playback device.

It is another object of this invention to provide a convenient and simplified control panel having all of the controls for the various operations of a record/playback device located thereon.

These and other objects of this invention will become apparent to those skilled in the art upon consideration of the accompanying specification, claims, and drawings.

Referring to the drawings, wherein like characters indicate like parts throughout the figures:

FIG. 2 is a top view of the recorder/playback device with some parts removed and some parts illustrated in section to show the working parts of the invention;

FIG. 3 is a sectional view taken along line 3—3 of FIG. 1;

FIG. 21 is an enlarged sectional view taken along the line 21—21 of FIG. 2, some parts omitted;

FIG. 22 is a perspective view illustrating the speed changing apparatus and drive mechanism in the slow speed mode of operation showing the capstan roller in dotted lines;

FIG. 23 is a perspective view illustrating the speed changing device and the drive mechanism in the fast speed mode of operation showing the capstan roller in dotted lines.

Figure 1:
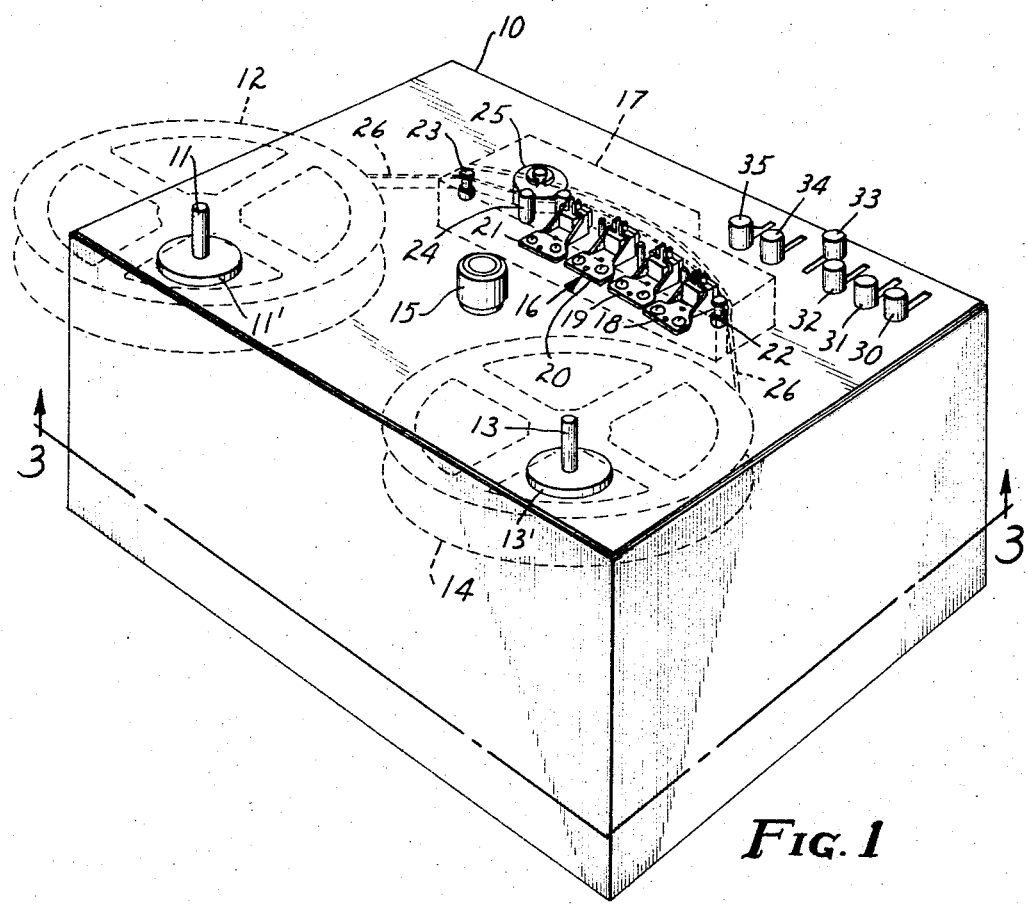
FIG. 1 is a perspective view of the recorder/playback device with some parts shown in dotted lines.

FIG. 1 is a perspective view of the record/playback device enclosed in a case 10. Protruding from the upper surface of the case 10 in the lower left-hand corner is a rotatably mounted shaft 11 with a reel 12 (shown in dotted lines) which is normally utilized as a takeup reel mounted thereon. Protruding from the case 10 in the lower right-hand corner is a rotatably mounted shaft 13 with a reel 14 (shown in dotted lines), normally utilized as a supply reel, mounted thereon. A knob 15 centrally located on the upper surface of case 10 is attached to a mechanism for changing the speed of the driving capstan hereinafter described.

A magnetic transducer assembly 16 is illustrated in FIG. 1 which is normally covered with a dust cover 17 shown in dotted lines. Included in the magnetic transducer assembly 16 is a plurality of positions for transducers, all of which are shown with transducers in place in FIG. 1. The transducers are numbered 18–21 and are illustrated in FIG. 1 simply to show their relative positions. It should be noted that while there are provisions for a plurality of transducers for various operations such as record, erase, playback monaural and playback binaural all of these transducers are not required in the operation of the present device. Also located on the magnetic transducer assembly 16 and at either end of the series of transducers 18–21 are a pair of compliance pins designated 22 and 23, which guide the tape from the reels 12 and 14 past the transducers. A driving capstan 24 and a cooperating idler roller 25, located near the magnetic transducer assembly 16 drive the recording carrier, which may be a magnetic tape 26, at the correct speed past the transducers 18–21.

Located at the upper right-hand corner on the top of the case 10 are a plurality of knobs 30–35. The knobs 30, 32, 33, 34 and 35 are connected to five mechanical switches or actuators which, when moved from their normal spring biased position to their operate position, place the record/playback device in its various modes of operation. When either of the five knobs 30, 32, 33, 34 or 35 is moved to the operate position it engages a locking device, hereinafter described, and remains in the operate position. The sixth knob, which is numbered 31, is connected to a mechanical arrester which disengages any of the five actuators from their operating positions and allows them to return to the normal or spring biased position, as will be more fully explained later. The knobs 30–35 when moved from their normal to their operating position place the device in the rewind mode, stop, fast forward wind mode, playback mode, record mode (when moved to the operating position simultaneously with the playback mode knob) and pause mode respectively.

FIG. 2 is a top view of the record/playback device with some parts removed and some parts shown in section so that the various linking mechanisms may be seen more clearly. All of the knobs 30–35 and the actuators and arrester connected thereto, located on a control panel generally designated 28, are shown in their normal positions and, therefore, the entire mechanical apparatus is not in operation in this figure. The various actuators and the arrester associated with the knobs 30–35 are designated 30'–35' respectively. The entire base plate on which is mounted all of the apparatus to be explained is designated number 29.

A rod 41 is connected to the actuator 30' at one end and passes through a hole in a protruding portion at one end of a flat lever 42. The end of the rod 41 which passes through the hole is threaded and has a nut 43 thereon which may be moved to adjust the linkage between the rod 41 and the lever 42. The lever 42 is rotatably mounted to the base plate 29 by means of a centrally located bolt 44. Rotatably mounted at the other end of the lever 42 is a pulley 45. Pulley 45 is connected to a pulley 13', fixedly mounted on shaft 13, by means of a flexible drive belt 46.

A rod 50 is connected at one end to actuator 32' and the other end passes through a hole in a protrusion on one end of a lever 51. The end of rod 50 which passes through the hole in lever 51 is threaded and has a nut 52 thereon which may be turned to adjust the linkage between rod 50 and lever 51. The flat plate making up lever 51 is rotatably mounted on base plate 29 in a plane parallel to base plate 29, by means of a centrally located bolt 53. The other end of the lever 51 has a protrusion therefrom which is slidably engaged with a slot 54 in one end of a linking plate 55. Plate 55 is slidably mounted on base plate 29 by means of a centrally located bolt 56. Rotatably mounted near the other end of plate 55 is an idler wheel 57. Idler wheel 57 is utilized to take up slack in a belt 58 which encircles a driving pulley 59, fixedly mounted to the shaft 60 of a motive means, and a pulley 11' which is fixedly mounted on shaft 11.

Figure 9:
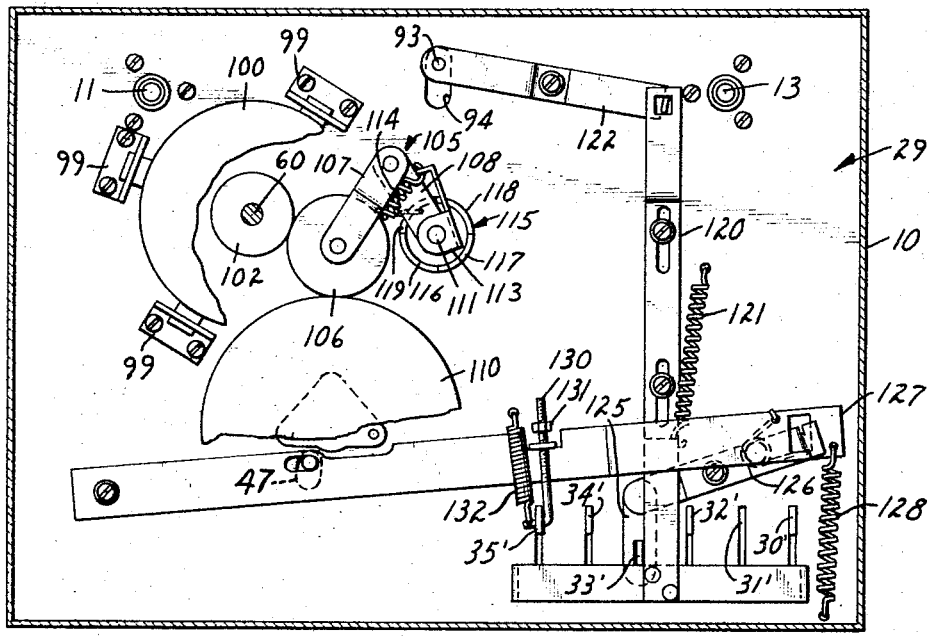
FIG. 9 is a view similar to FIG. 3 illustrating the operation of corresponding parts in the playback mode of the device with some parts broken away.

The magnetic transducer assembly 16 with the transducers 18–21 mounted thereon is shown centrally mounted on the base plate 29. The capstan 24 is mounted to the left of the transducers and consists of a shaft which passes through the base plate 29 and a semicircular indented portion in the magnetic transducer assembly 16. The capstan is mounted so that the front of the transducers 18–21 and the side of the capstan form an arc over which the tape will pass freely. A lever 61, which is rotatably mounted and in sliding engagement at one end with actuators 33'–35' has a compression spring 62 fixedly connected to the other end. The other end of compression spring 62 is fixedly connected to approximately the center of a lever 63. Lever 63 is rotatably mounted and has a pair of pins 64 which bear against the magnetic tape and normally hold it away from the transducers 18 through 21. Whenever actuators 33'–35' are in the operate position the pins 64 are moved into indents and allow the magnetic tape to engage the surfaces of the transducers 18–21. The idler roller 25 which cooperates with the capstan 24 to drive the tape past the transducers 18–21 is mounted on a shaft 65. Shaft 65 passes through a lever 66 which is rotatably mounted to the base plate 29 by a bolt 67. Shaft 65 also passes through a slot 47, as shown in FIG. 9, in the base plate 29 and is connected to a lever hereinafter described mounted for vertical movement on the back of base plate 29. Thus, shaft 65 is vertically movable so that idler roller 25 can be moved in contact with capstan 24 or disengaged therefrom as desired.

A U-shaped member 68 is rotatably mounted to the base plate 29 by means of a bolt 69 passed through the bight thereof. One arm of the U-shaped member 68 is engaged in a slot in the lever 66 and moves upward or counterclockwise in FIG. 2 when the idler roller 25 is engaged with capstan 24. The other arm of the U-shaped member 68 has a hole therein and a bent portion of a rod 70 is passed through the hole. The other end of rod 70 is passed through a hole in a protruding portion of the flat plate 55. A spring 71 has one end butted against the protruding portion of the flat plate 55 and the other end butted against a pair of nuts 72 which are threaded onto the rod 70. The nuts 72 may be moved to adjust the amount of compression in the spring 71.

The U-shaped member 68 and the rod 70 in conjunction with the compression spring 71 operate to push the flat plate 55 downward in FIG. 2 when the idler roller 25 is in contact with the capstan 24. Thus, the idler wheel 57 provides tension in the belt 58 and shaft 11 is driven by the drive pulley 59. Since the idler wheel 57 is held against the belt 58 by the compression spring 71 the entire mechanism acts as a clutch and shaft 11 will be allowed to slip. In this fashion when a magnetic tape is driven across the heads 18–21 by capstan 24 and idler roller 25 at a speed which is less than the speed of the drive pulley 59 the reel 12 on shaft 11 will simply act to maintain tension in the tape.

A brake shoe 75 is centrally mounted on a generally Z-shaped member 76 for frictional contact with pulley 13' on shaft 13. One end of the Z-shaped member 76 is fixedly attached to the base plate 29 by means of a mounting plate 77. A flat leaf spring is fixedly attached to the Z-shaped member 76 at one end and the other end bears on a cam-shaped member 79 to hold the brake shoe 75 against the pulley 13' when the Z-shaped member 76 is in its normal position. Cam 79 may be manually rotated to adjust the amount of pressure with which brake shoe 75 bears on pulley 13'.

The end of Z-shaped member 76 which is not fixedly attached to the mounting plate 77 is normally engaged in a slotted portion in one arm of an L-shaped member 80. L-shaped member 80 is slidably mounted on rods 41 and 50 for movement parallel thereto by means of protruding portions with holes therein. L-shaped member 80 is mounted so that one leg is parallel with rod 50 and the other leg is perpendicular to rod 41. A guide 81, which is fixedly attached to the base plate 29, passes over the leg of the L-shaped member 80 which is parallel to the rod 50 and allows the L-shaped member 80 to slide thereunder in a vertical direction in FIG. 2.

L-shaped member 80 is spring biased to the position shown by a spring 82. When the L-shaped member 80 is moved upward in FIG. 2 by means of rod 41 and actuator 30' the Z-shaped member 76 is forced out of the slot in the side of the arm of the L-shaped member 80 and pulls the brake shoe 75 away from the pulley 13', thereby, allowing the shaft 13 to rotate at a much greater speed. This greater speed is utilized in conjunction with the knobs 30 and 32 as will be explained more fully later.

A brake shoe 85 is fixedly mounted at one end of a rotatably mounted lever 86. Rotatably mounted lever 86 is movable to engage or disengage brake shoe 85 with pulley 13'. A U-shaped spring 87 which operates in compression and a tension spring 88 connected between the base plate 29 and the other end of lever 86 operate to maintain the lever 86 in contact with pulley 13' and in its normal position, as shown. A brake shoe 89 is fixedly mounted at one end of a rotatably mounted lever 90. The lever 90 is movable to engage or disengage brake shoe 89 with pulley 11'. Lever 90 is maintained in its normal position, as shown, by a U-shaped compression spring 91 and a tension spring 92 connected to the other end thereof. Both of the levers 86 and 90 are movable by a shaft 93 protruding through a slot 94 in the base plate 29 and movable in a vertical direction in FIG. 2.

FIG. 3 shows the linking mechanism on the back side of the base plate 29. The motive means consists of an electric motor 100 with the shaft 60 running therethrough having a cooling fan 101 connected at one end and the driving pulley 59 (shown in FIG. 2) connected at the other end. Motor 100 is fixedly mounted to base plate 29 by means of a plurality of shock mounts 99. Speed changing mechanism 105, which will be shown in more detail in FIGS. 22 and 23, is mounted in proximity to motor 100 and connects the shaft 60 of motor 100 to a roller 110 fixedly connected to the capstan 24 and forming the driving member thereof.

All of the actuators 30', 32', 33', 34' and 35' and the arrester 31' are mounted for parallel vertical movement in FIG. 3. An inverted T-shaped bar 120 is slidably mounted for vertical movement and the cross arm is engaged with a slot in each of the actuators 30', 32', 33', 34' and 35' so that when any of these actuators are moved vertically downward in FIG. 3 the T-shaped member 120 also moves downward. The T-shaped member 120 is biased to the position shown by a spring 121. A lever 122 is rotatably mounted to the base plate 29 and has a protruding portion at one end thereof engaged in a slot at the upper end of the inverted T-shaped member 120. The other end of the lever 122 has the shaft 93 fixedly attached thereto. Thus, when the T-shaped member 120 is moved downward by any of the actuators 30', 32', 33', 34' or 35' the lever 122 is rotated clockwise and the shaft 93 is moved upward which, as can be seen in FIG. 2 disengages the brake shoes 85 and 89 from the pulleys 13' and 11' respectively.

The actuator 33' passes through a slot in one end of a linking member 125. The other end of linking member 125 is rotatably connected to one end of a lever 126 (shown in dotted lines) which is rotatably mounted to the base plate 29. The actuator 33' also bears against the cross arm of the T-shaped member 120 so that when the actuator 33' is moved downward in FIG. 3 the T-shaped member 120 moves downward and the lever 126 is rotated in a counterclockwise direction. The end of the lever 126 which is opposite the end joined to member 125 has a protruding portion thereon which passes through a slot in one end of a lever 127. Lever 127 is nearly the length of the base plate 29 and is rotatably connected to the base plate 29 at its far end. A spring 128 biases the lever 127 to the position shown in FIG. 3.

An L-shaped rod 130 having one arm through a hole in actuator 35' and the other arm through a hole in a protrusion from lever 127 acts as a stop for lever 127. The arm of the L-shaped rod 130 which passes through the hole in the protrusion in lever 127 is threaded and has a nut 131 thereon which is moved to the point at which lever 127 cannot rotate when actuator 35' is in the operate position. A spring 132 biases the actuator 35' and the rod 130 to the positions shown.

Figure 4:
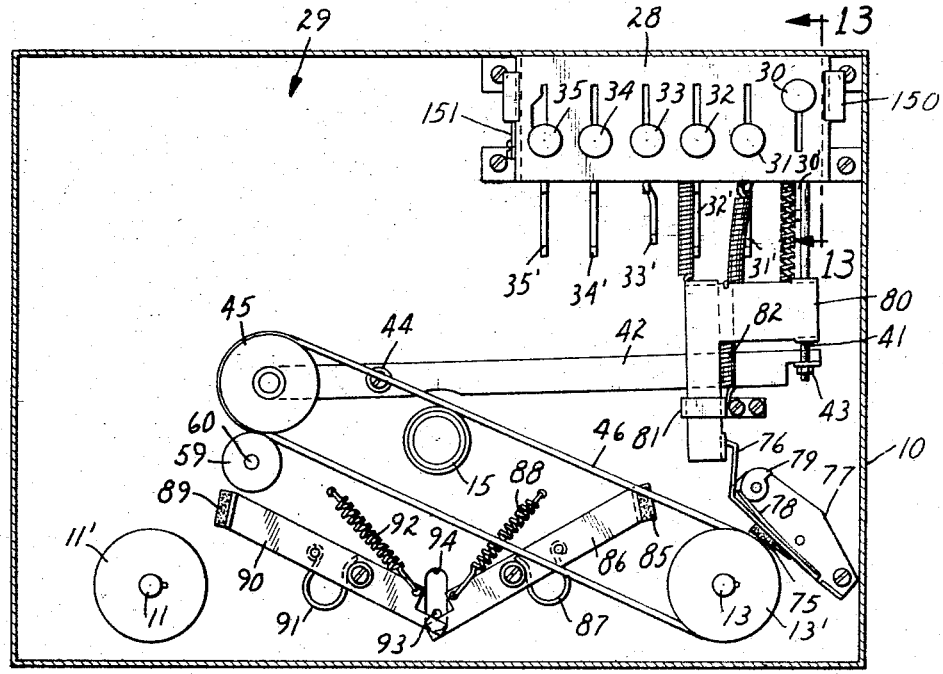
FIG. 4 is a top view similar to FIG. 2 with some parts omitted to more clearly show the working parts of the rewind mode of the device.

The operation of the various linking apparatus will now be explained in conjunction with the remainder of the drawings. In FIG. 4 only the apparatus necessary to the operation of the knob 30 and actuator 30' are illustrated. When the knob 30 and the actuator 30' are moved from the normal to the operate position, as shown, the rod 41 is pulled upward, the L-shaped plate 80 is pulled upward also and slides along the rod 50 connected to the actuator 32' (not shown in FIG. 4). As the L-shaped member 80 moves upward the Z-shaped member 76 is moved out of the slot in the arm of the L-shaped member 80 thereby disengaging the brake shoe 75 from the pulley 13' on shaft 13. The rod 41 also pulls the right-hand end of the lever 42 upward thereby rotating the lever counterclockwise about the bolt 44 and causing the pulley 45, mounted at the other end of the lever 42 to bear against the driving pulley 59 mounted on the shaft 60 of the motor 100. Since the pulley 45 bears against the driving pulley 59, the pulley 45 and consequently the pulley 13', through the belt 46, are driven at the speed of the driving pullley 59.

Figure 5:
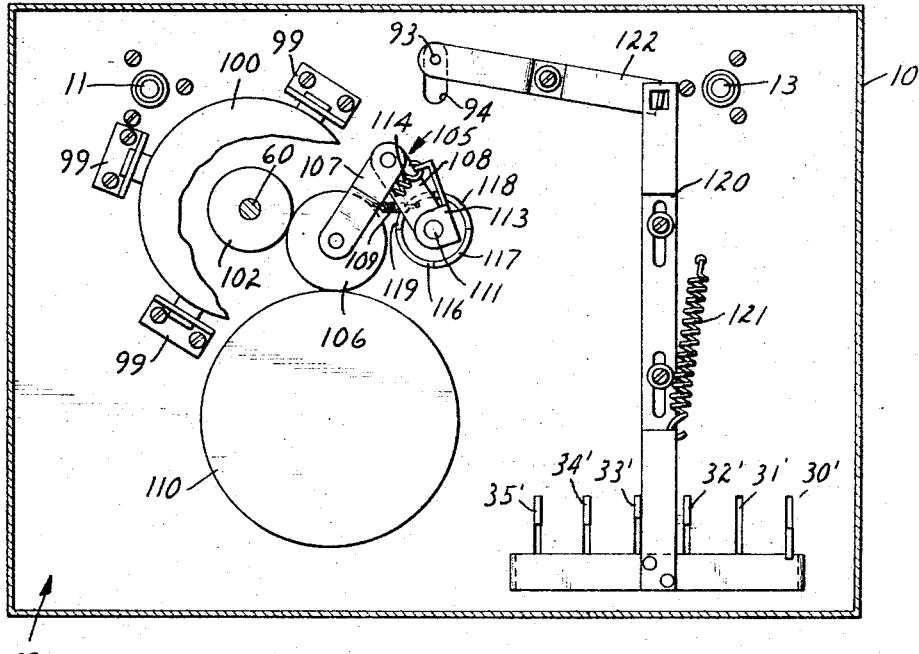
FIG. 5 is a view similar to FIG. 3 illustrating the operation of corresponding parts in the rewind mode of the device.

Simultaneous with the disengagement of brake shoe 75 and the contact of pulley 45 with driving pulley 59, the movement of actuator 30' from the normal to the operate position causes the inverted T-shaped member 120 to move downward in FIG. 5. The downward movement of the T-shaped member 120 causes the lever 122 to rotate in a clockwise direction moving the shaft 93 to the top of the slot 94 in the base plate 29. Referring again to FIG. 4 it can be seen that the movement of the shaft 93 (the base plate 29 has been inverted from FIG. 4 to FIG. 5 so that the upper end of slot 94 in FIG. 5 is the lower end of slot 94 in FIG. 4) has rotated the lever 86 in a counterclockwise direction thereby disengaging the brake shoe 85 from the pulley 13' and has rotated the lever arm 90 in a clockwise direction thereby disengaging the brake shoe 89 from the pulley 11'. Thus, by moving the knob 30 from the normal to the operating position the shaft 13 and, therefore, the reel 14 is driven by the motor 100 at a high speed, since the brake shoe 75 is also removed from the pulley 13'. Since the reel 14 is normally the supply reel and the reel 12 is normally the takeup reel, when the tape is wound from the reel 12 to the reel 14, as when the knob 30 is moved from the normal to the operate position, the device is in the rewind mode of operation.

Figure 6:
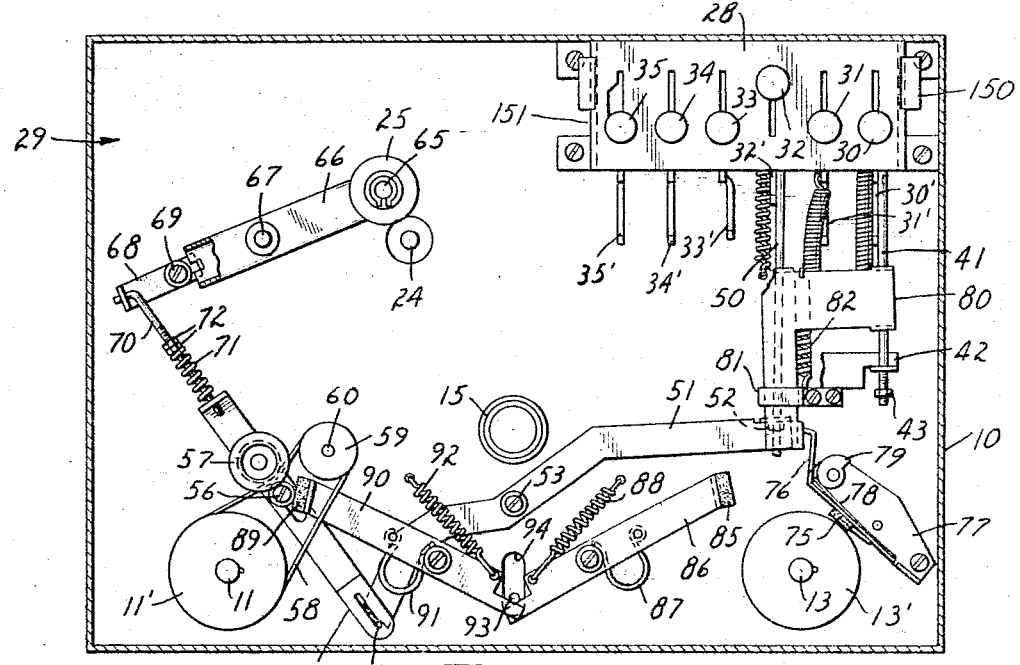
FIG. 6 is a top view similar to FIG. 2 with some parts omitted and some parts illustrated in section to more clearly show the operation of the fast forward mode of the device.
Figure 24:
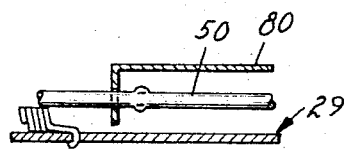
FIG. 24 is an enlarged sectional view taken along line 24—24 of FIG. 7.

The T-shaped member 120 and the lever 122 operate in the same manner as previously described when the knob 32 and the actuator 32' are moved from the normal to the operate position. As can be seen in FIG. 6 the knob 32 is in the operate position and the shaft 93 is at the lower end of the slot 94 and therefore the brake shoes 85 and 89 are disengaged from the pulleys 13' and 11' respectively. The L-shaped member 80 moves upward in FIG. 6 with the rod 50 (see FIG. 24 for a side view of one practical method of connecting rod 50 or rod 41 to member 80) to remove the Z-shaped member 76 from the slot in the arm of the L-shaped member 80 thereby disengaging the brake shoe 75 from the pulley 13'. The movement of rod 50 upward in FIG. 6 also pulls the end of the lever 51 upward thereby causing it to rotate about the bolt 53 in a counterclockwise direction. This rotation of lever 51 causes the protruding portion at the other end, which is engaged with slot 54 in the sliding plate 55, to slide the plate 55 downward in FIG. 6 thereby causing the idler wheel 57 to tighten the belt 58 and cause the driving pulley 59 to drive the pulley 11'.

The sliding plate 55 slides along the rod 70 in a downward direction having no effect thereon. The U-shaped member 68 and the lever 66 remain as shown and the idler roller 25 does not bear on the capstan 24. Since the brake shoe 75 is disengaged from the roller 13' and the roller 11' is being driven by motor 100 the device is now in the fast forward mode of operation.

Figure 8:
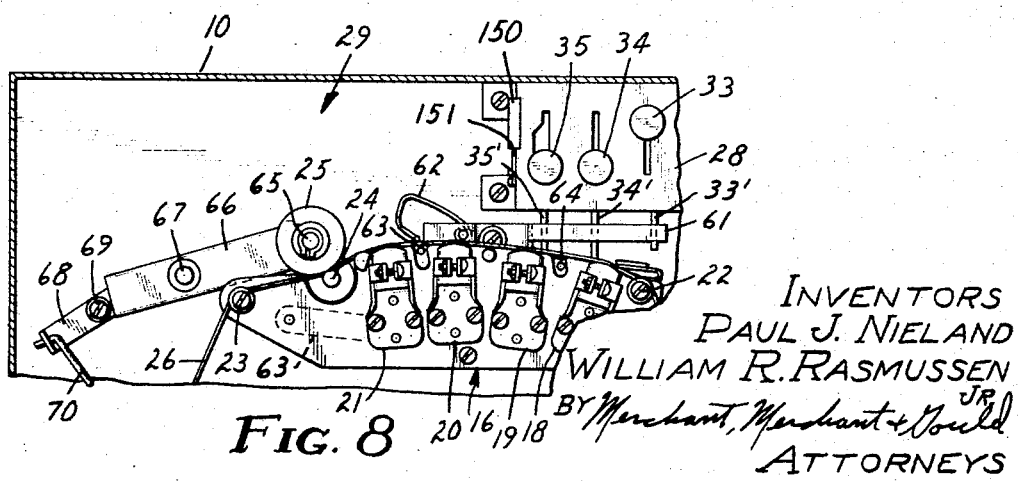
FIG. 8 is a fragmentary view similar to FIG. 7 illustrating the transducers and the recording tape interwoven.
Figure 7:
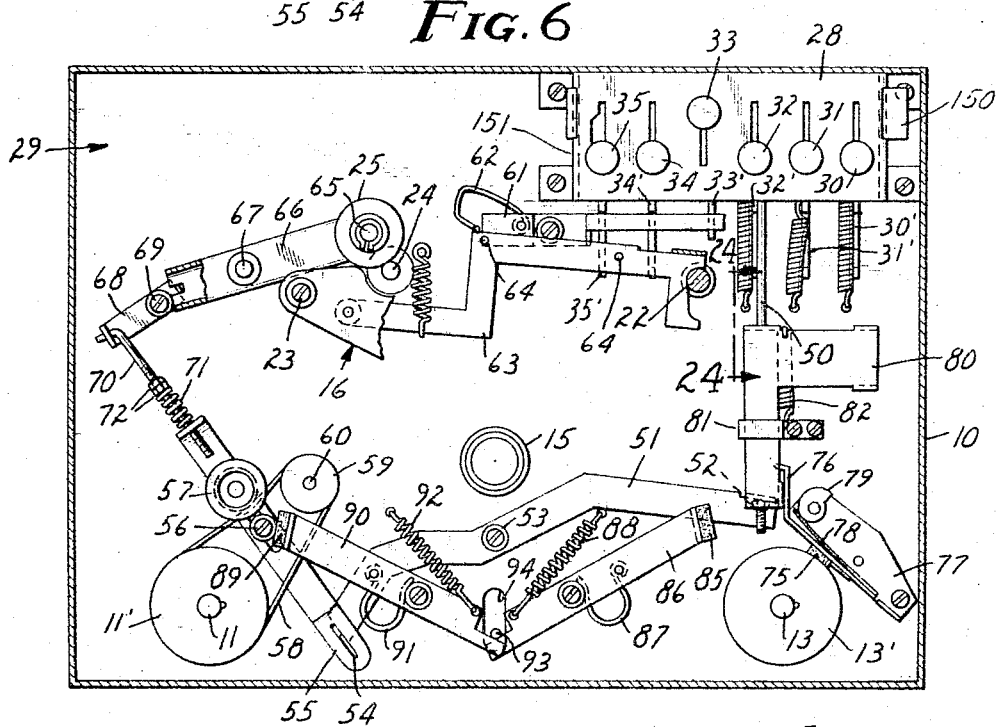
FIG. 7 is a top view similar to FIG. 2 with some parts omitted and some parts illustrated in section to more clearly show the operation of the playback mode of the device.

In FIG. 7 the knob 33 and actuator 33' are moved from the normal to the operate position. To understand the movement of the apparatus when the knob 33 is moved the FIGS. 7, 8 and 9 should be studied simultaneously. The brake shoe 75 is not affected when the knob 33 is moved and, thus, it still bears against the pulley 13'. The T-shaped member 120 is moved downward in FIG. 9 with the actuator 33', thereby, rotating the lever 122 in a clockwise direction and causing the brake shoes 85 and 89 to be disengaged from the pulleys 13' and 11'. In addition, the movement of actuator 33' moves linking member 125 downward in FIG. 9 and causes the lever 126 to rotate in a counterclockwise direction. The rotation of lever 126 causes the lever 127 to move upward in FIG. 9 which moves the shaft 65 mounted therein upward. Referring to FIG. 7 it can be seen that the movement of shaft 65 causes the idler roller 25, mounted thereon, to come into contact with capstan 24. Thus, the tape which passes between the idler roller 25 and capstan 24 will be driven past the transducers 18-21, as shown in FIG. 8.

When actuator 33' is moved into the operate position the lever 61 is rotated in a counterclockwise direction compressing spring 62 which forces the member 63 to move downward in FIG. 7, thereby, pushing the pins 64 into the indents in the magnetic transducer assembly 16 and allowing the tape 26 to bear against the surface of the transducers 18-21.

The movement in FIG. 7 of shaft 65 and idler roller 25 downward to contact capstan 24 also causes the lever 66 to move in a clockwise direction. The U-shaped member 68, which has one arm thereof engaged in a slot in the lever 66, rotates in a counterclockwise direction with the clockwise movement of lever 66. The counterclockwise movement of the U-shaped member 68 forces the rod 70 toward the slidably mounted member 55 thereby causing the spring 71 to compress and force the slidable member 55 downward in FIG. 7. The movement of the member 55 causes the idler wheel 57, which is attached thereto, to tighten the belt 58 which encircles the driving pulley 59 and pulley 11', thereby, causing the pulley 11' to be driven.

Thus, the tape 26 from supply reel 14 on shaft 13 bears against the transducers 18-21 as pins 64 in lever 63 move into the indents and is pulled from the reel 14 across the front surface of the transducers by the rotating capstan 24 and the idler roller 25 in contact therewith. The tape 26 is then taken up by reel 12 which is being driven on shaft 11 by driving pulley 59. The capstan 24 is caused to rotate by the engagement of an idler wheel 106, which is a portion of the speed changing mechanism 105, with a driving wheel 102, which is fixedly attached to shaft 60 of motor 100 and the roller 110 which is fixedly attached to the capstan 24. The knob 33, thus, places the device in the playback mode of operation.

Figure 10:
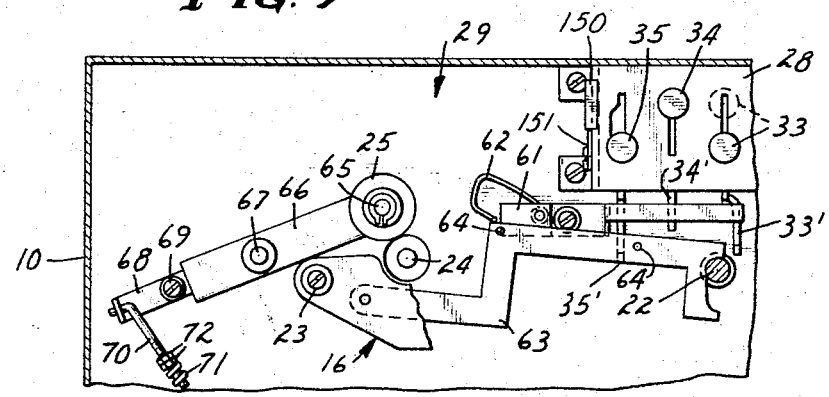
FIG. 10 is a fragmentary view similar to FIG. 7 illustrating the operation of the linking mechanism when the record actuator is moved.

In FIG. 10 the knob 34 and actuator 34' have been moved from the normal to the operate position. The movement of the actuator 34' rotates the lever 61 in the counterclockwise position causing spring 62 to compress and move the member 63 downward in FIG. 10 thereby forcing the pins 64 away from the recording carrier. When the knob 34 and actuator 34' are moved singly this is the only effect they have on the device except to release the brake shoes 85 and 89 from the pulleys 13' and 11' as explained in conjunction with FIG. 5. Knob 34 is actually the recording button but as a safety feature when this button is moved to the operate position singly no drive is provided for the recording carrier. Thus, in the event that an operator inadvertently pushes the record knob 34 rather than the play knob 33 nothing happens and the recording which the operator desires to play back is not erased. To operate this device in the record mode the record knob 34 and the playback knob 33 must be moved to the operate position simultaneously. As an additional safety feature in the event that one of the knobs, for example knob 33, is in the operate position if the operator moves the other knob 34 to the operate position the knob 33 will simply be disengaged and the device will not be in the record mode. The operation of the locking mechanism for the actuators will be discussed more fully later.

Figure 11:
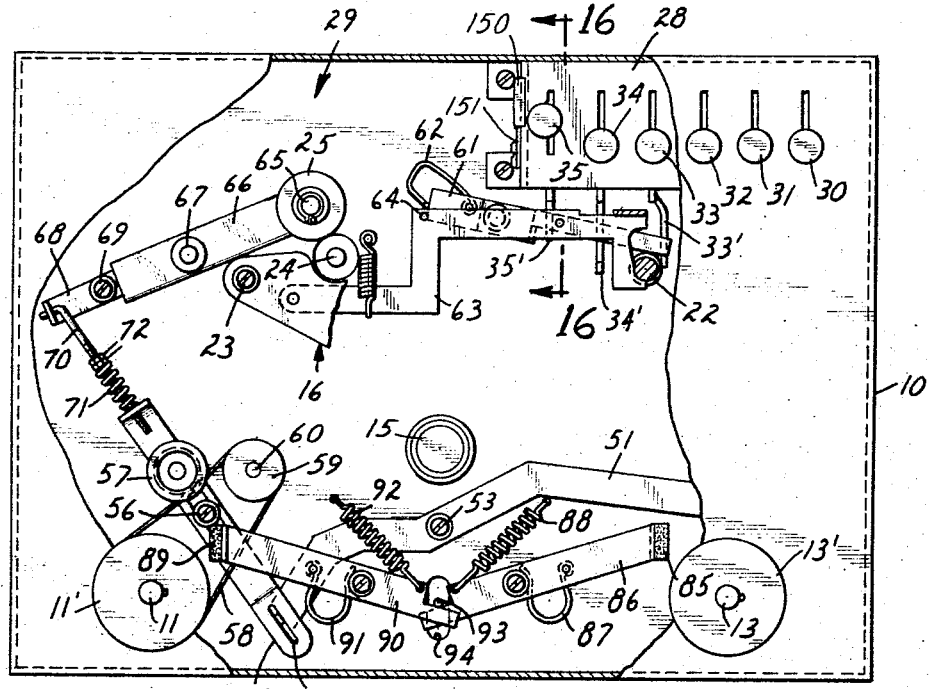
FIG. 11 is a top view similar to FIG. 2 with some parts omitted and some parts illustrated in section to more clearly show the operation of the pause mode of the device.
Figure 12:
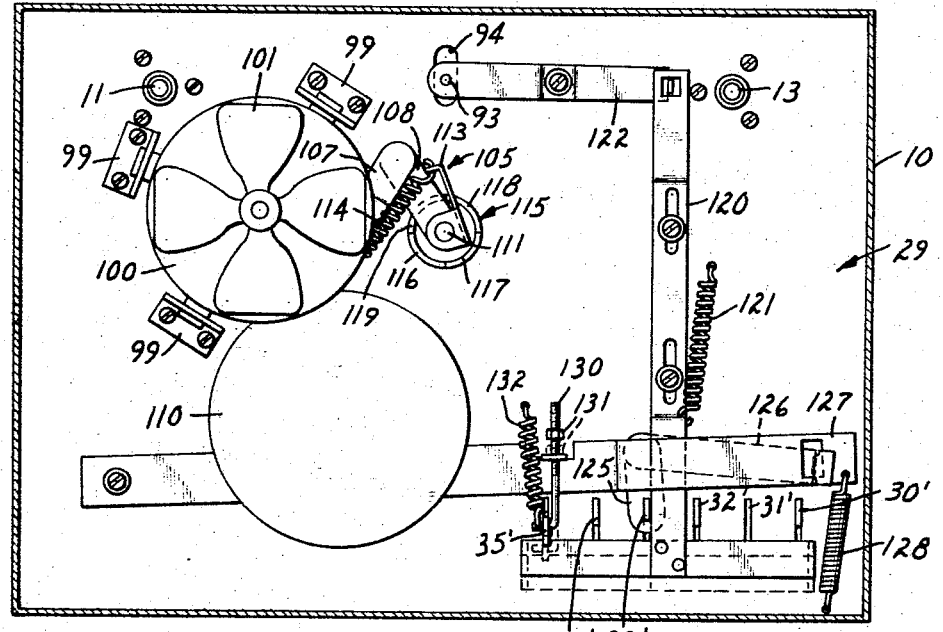
FIG. 12 is a view similar to FIG. 3 illustrating the operation of corresponding parts in the pause mode.

FIGS. 11 and 12 show the operation of the linking apparatus when the knob 35 and actuator 35' are moved from the normal position. The actuator 35' has three positions—a normal position, a pause position and an edit position. When the actuator 35' is in the pause position, shown in FIGS. 11 and 12, the T-shaped member 120 is moved slightly downward in FIG. 12 and lever 122 is rotated clockwise moving shaft 93 part way across the slot 94 in the base plate 29. The movement of shaft 93 moves the levers 90 and 86, thereby, removing brake shoes 85 and 89 from pulleys 13' and 11' leaving those pulleys free running. The lever 61 is so positioned relative to actuator 35' that moving said actuator from the normal to the first position has no effect on lever 61. The idler roller 25 is not moved against capstan 24 and does not drive the tape 26 past the transducers 18-21. Since the shafts 11 and 13 are free running the reels 12 and 14 are free running and the reels may be rotated manually to move the tape 26 to any desired position. Also, this position of knob 35 may be utilized for a pause in the recording or playback modes.

When the knob 35 and actuator 35' are moved into the second or edit position the brake shoes 85 and 89 are still disengaged from the pulleys 13' and 11' respectively, and, thus, shafts 13 and 11 are both free running. However, the lever 61 is moved in a counterclockwise direction causing the spring 62 to compress and push the lever 63 in a clockwise direction in FIG. 11. The movement of lever 63 causes pins 64 to move into the indents in the the magnetic transducer assembly 16 thereby allowing the tape 26 to bear against the transducers 18-21. Thus, the tape 26 and the shafts 11 and 13 are not driven mechanically but the tape 26 bears against the transducers 18-21 so that it may be moved manually while the electronics is on and thereby edited.

Figure 13:
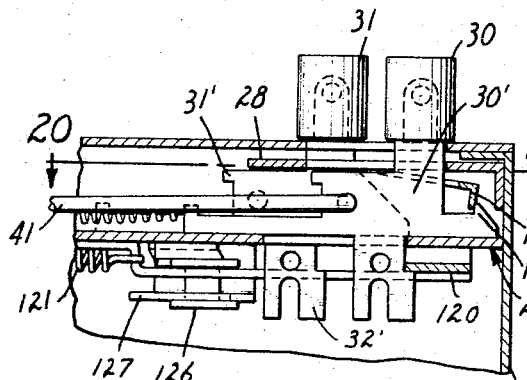
FIG. 13 is an enlarged sectional view taken along the lines 13—13 of FIG. 4.
Figure 14:
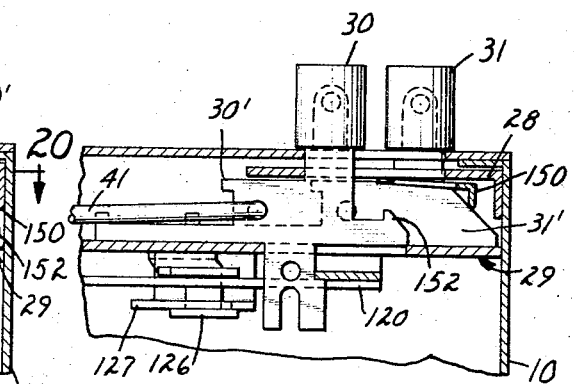
FIG. 14 is a sectional view similar to FIG. 13 illustrating release of the holding mechanism.
Figure 15:
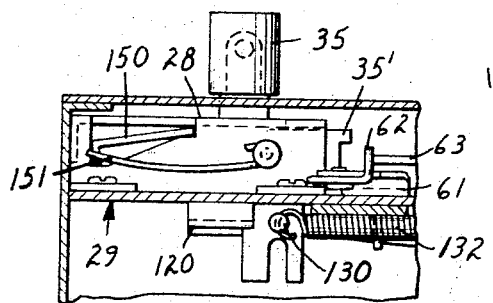
FIG. 15 is an enlarged sectional view taken along the line 15—15 of FIG. 2.
Figure 16:
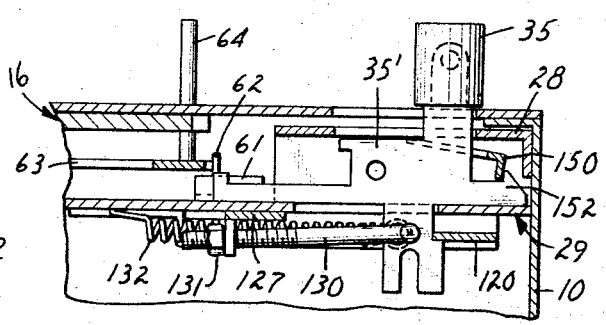
FIG. 16 is an enlarged sectional view taken along the line 16—16 of FIG. 11 illustrating an actuator or operator lever in its full operated position.
Figure 17:
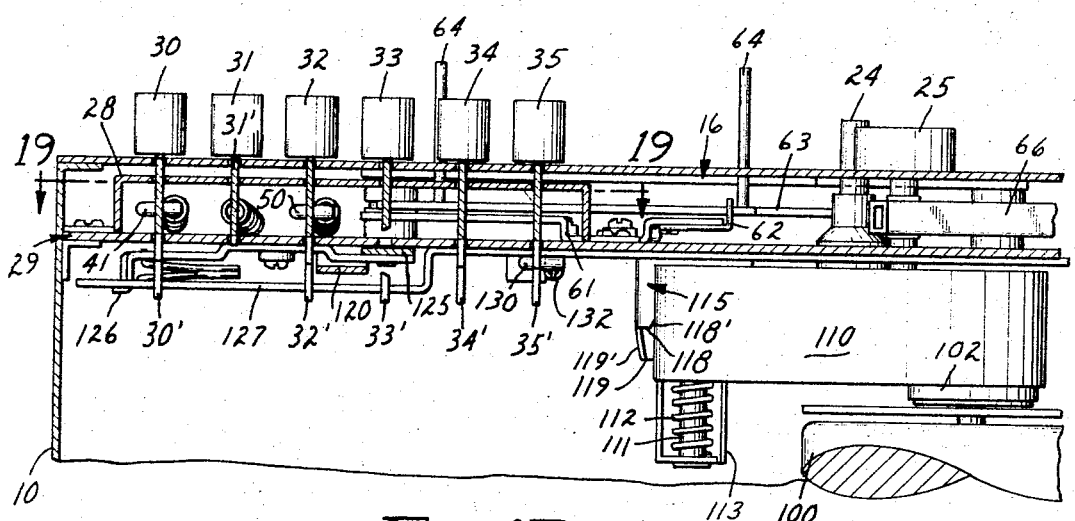
FIG. 17 is an enlarged sectional view taken along the line 17—17 of FIG. 2.

FIGS. 13-20 illustrate the mechanical operation of the actuators 30', 32', 33', 34' and 35' and the arrester 31' as well as the mechanism which locks the actuators in their operate positions. In FIG. 13 the actuator 30' is shown in its operate position. A protruding portion or hooked end numbered 152 of actuator 30' is shown engaged with a locking bar 150. Locking bar 150 has an L-shaped cross section and is mounted in slots in control panel 28. The slots in control panel 28 have a somewhat triangular shape with one arm of the locking bar 150 at the apex of the triangle. Thus, as seen in FIG. 15, which is a view from the other end of the base plate 29, the locking bar 150 has a small area in which it can rotate about the end of the arm at the apex of the triangular shaped slot. As seen in FIG. 15 a spring 151 biases the locking bar 150 in a full counterclockwise rotated direction. The protruding portion 152 of actuator 30', which is similar to all of the actuators, has a sloping portion thereon which causes the locking bar 150 to slide up and drop into engagement with the protruding portion 152 as shown in FIG. 16. The engagement of the locking bar 150 and protruding portion 152 of actuator 30' cause the actuator 30' to be locked in the operate position.

When it is desired to disengage any of the actuators from the operate position the arrester 31' is moved from its normal position to its operate position. The arrester 31' does not have a protruding portion thereon but simply has a sloping portion where the protruding portion of the actuators is located. Thus, when the arrester 31' is moved to the operate position the locking bar 150 is rotated away from the protruding portions 152 of the actuators, thereby, disengaging the locking bar 150 from the protruding portions of the actuators. Since the actuators are spring biased to a normal position once the locking bar 150 is moved out of engagement with the protruding portions the actuators return to the normal position. Since the arrester 31' does not have a protruding portion thereon it does not engage with the locking bar 150 and simply returns to the normal position when the operator releases the knob 31.

If actuator 34' is moved to the operate position while actuator 33' is already in the operate position the locking bar 150 will be moved out of engagement with the protruding portion on the actuator 33', allowing actuator 33' to return to the normal position, after which, the locking bar 150 will move into engagement with the protruding member on the actuator 34' and that actuator will be locked in the operate position. Thus, the locking mechanism provides an additional safety feature.

Figure 19:
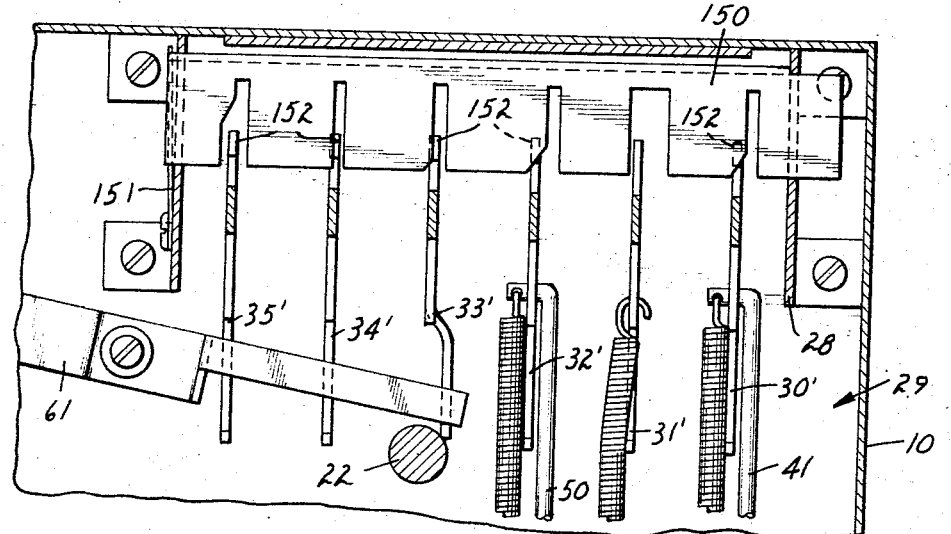
FIG. 19 is an enlarged sectional view taken along the line 19—19 of FIG. 17.
Figure 20:
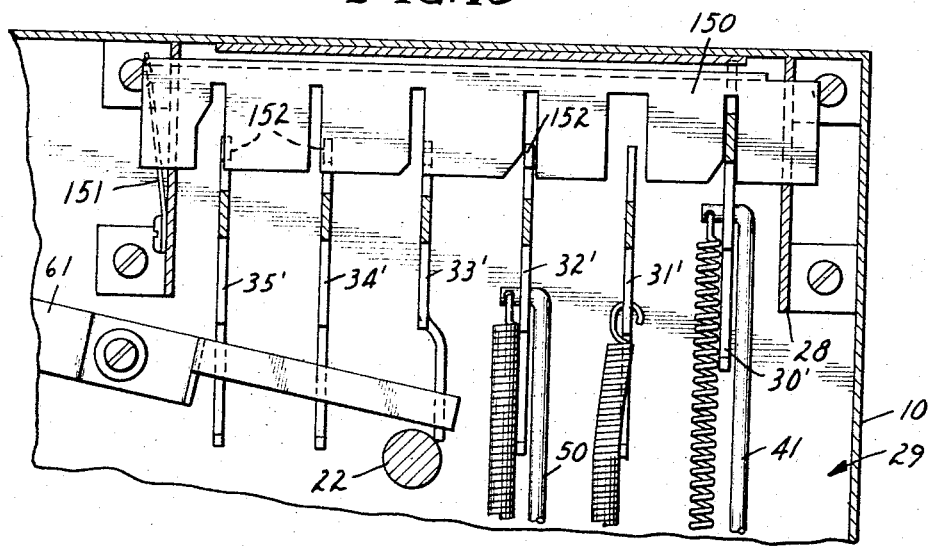
FIG. 20 is a sectional view taken along the line 20—20 of FIG. 13.
Figure 18:
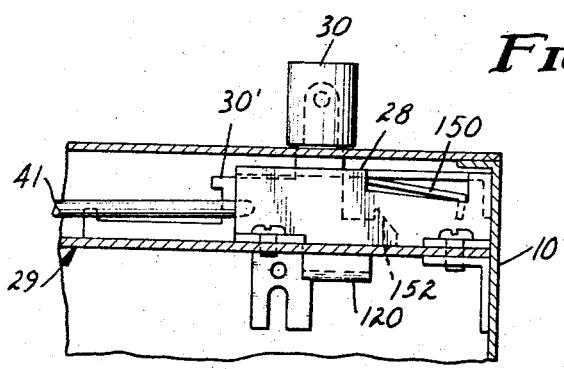
FIG. 18 is an enlarged sectional view taken along the line 18—18 of FIG. 2.

FIGS. 19 and 20 illustrate the position of the locking bar 150 relative to the positions of the actuators and arrester. In FIG. 19 all of the actuators and the arrester are in the normal position. In FIG. 20 the actuator 30' is shown locked in the operate position by the locking bar 150. The protruding portion 152 of the actuator 30' can be seen engaged with the locking bar 150.

An additional locking feature of the locking bar 150 can also be seen in FIGS. 19 and 20. The locking bar 150 has a plurality of slots therein one of which corresponds to each of the actuators and the arrester. The slots are slightly offset so they are not exactly aligned with the actuators and the arrester but the slots corresponding to actuators 30', 32', 33' and 35' have a slightly sloping portion on the left side thereof in FIGS. 19 and 20. Thus, when any one of these actuators are moved, as illustrated in FIG. 20 where actuator 30' is in the operate position, the locking bar 150 is moved sideways an amount sufficient to prevent any of the other actuators from being moved to the operate position. However, the arrester 31' has an extra wide slot in the locking bar 150 associated with it and, therefore, it can be moved to the operate or stop position at any time.

FIGS. 21, 22 and 23 illustrate the operation of the speed changing mechanism 105. The centrally located knob 15 is fixedly attached to a rotatably mounted shaft 111. Fixedly attached to the shaft 111 is a cylindrical cam 115 having a plurality of cam surfaces with dwell surfaces therebetween. A first dwell surface 116 can be seen in FIG. 23 and a second dwell surface 117 with a cam surface 117' therebetween is illustrated. The cylindrical cam 115 has a third dwell surface 118 with a cam surface 118' between the dwell surface 118 and the dwell surface 117. The cylindrical cam 115 has a fourth dwell surface 119 with a cam surface 119' between the dwell surfaces 118 and 119.

A lever 108 has one end slidably mounted on shaft 111. A compression spring 112 is also mounted on shaft 111 and biases lever 108 against the surfaces of the cylindrical cam 115. The other end of the lever 108 is rotatably attached to one end of a connecting means 107 the other end of which has an idler wheel 106 rotatably mounted thereon. A spring 109 has one end attached to the lever 108 and the other end attached to the connecting means 107 thereby pulling the idler wheel 106 away from the shaft 60 when the knob 15 is turned to change speeds of the capstan 24. Also the spring 109 helps to insure a snug engagement between the idler wheel 106 and the roller 110 which is fixedly attached to the capstan 24.

The motor 100 has a shaft 60 upon which is mounted a plurality of driving wheels 102, 103 and 104 each having a smaller radius than the previous wheel. These wheels are fixedly attached in a coaxial relationship to shaft 60 and operate to change the driving ratio between the motor 100 and the roller 110. As the knob 15 is manually rotated the cylindrical cam 115 rotates and the cam areas, 117', 118' and 119', cause the lever 108 to slide axially along the axis 111 from one dwell surface to another. As the lever 108 moves from one dwell surface to another the idler wheel 106 moves from one of the driving wheels on shaft 60 to another, thereby, changing the driving ratio between the motor 100 and the roller 110.

For example, when the knob 15 indicates the slowest speed for the capstan 24 the lever 108 is resting on the dwell surface 116 and the idler wheel 106 is bearing directly on the shaft 60 and the roller 110. When the knob 15 indicates the next highest speed the lever 108 has been moved to the dwell surface 117 and the idler wheel 106 has been moved to bear against the drive wheel 104 and the roller 110. When the lever 108 is resting on the dwell surface 118 the idler wheel 106 is bearing against the drive wheel 103 and the roller 110 and when the lever 108 is resting on the dwell surface 119 the idler wheel 106 is bearing against the drive wheel 102 and the roller 110.

A plate 113, rotatably mounted on shaft 111 and biased by spring 114 bears against the lever 108 in a fashion to force the idler wheel 106 to bear against the roller 110 and the shaft 60 or one of its associated drive wheels. Thus, apparatus has been disclosed for conveniently and reliably shifting the speed of the capstan and, therefore, the speed at which the tape 26 is driven past the transducers 18–21.

The disclosed device contains apparatus for providing a plurality of operations by simply moving the desired switch, conveniently located on a control panel. All of the operations which the present device can provide are controlled by a plurality of switches located on the single control panel. Thus, the operation of the present device is greatly simplified and, because of the additional safety features incorporated, it is very difficult to ruin or erase previous recordings during the playback operation. Also, the present device incorporates a convenient and simplified speed control apparatus which is operated simply by turning a switch and does not require turning OFF the device and a lot of tedious placing and replacing of parts.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. In recording apparatus having a pair of rotatably mounted shafts adapted to receive reels thereon utilized alternatively and simultaneously as takeup and supply reels for a recording carrier, a driving capstan and motive means, the improvement in control apparatus comprising:
    (a) a control panel;
    (b) a plurality of mechanical actuators each having a protruding portion and a transversely extending member attached thereto;
    (c) a mechanical arrester having a transversely extending member attached thereto;
    (d) means mounting each of said actuators and said arrester on said control panel for individual parallel, axial slidable movement between a first and second position and spring biased to the first position;
    (e) a locking bar having a plurality of lateral slots therein mounted so its longitudinal axis is substantially perpendicular to the direction of movement of said actuators and said arrester for engaging said protruding portion when one of said actuators is moved to the second position and maintaining said one actuator in the second position, said arrester disengaging said protruding portion from said locking bar when moved to its second position;
    (f) said locking bar being further mounted for limited axial horizontal movement between a first and a second position and so that said transversely extending members are approximately aligned with said slots when said locking bar is in the first position and misaligned when said locking bar is in the second position;
    (g) said slots being formed so that movement of one of said actuators from the first to the second position moves said locking bar from the first to the second position whereby movement of a second actuator into the second position is prevented;
    (h) spring means biasing said locking bar into the first position; and
    (i) means linking said actuators to said motive means for selectively connecting said motive means to one of said shafts when a selected actuator is in the second position.

2. In recording apparatus having a pair of rotatably mounted shafts adapted to receive reels thereon utilized alternatively and simultaneously as takeup and supply reels for a recording carrier, a driving capstan and motive means, apparatus for selectively connecting said motive means to said shafts comprising:
    (a) a control panel;
    (b) a plurality of mechanical actuators each having a protruding portion and a transversely extending member attached thereto;
    (c) a mechanical arrester having a transversely extending member attached thereto;
    (d) means mounting each of said actuators and said arrester on said control panel for individual parallel, axial slidable movement between a first and a second position and spring biased to the first positions;
    (e) a locking bar having a plurality of lateral slots therein mounted so its longitudinal axis is substantially perpendicular to the direction of movement of said actuators and said arrester for engaging said protruding portion when one of said actuators is moved to the second position and maintaining said one actuator in the second position, said arrester disengaging said protruding portion from said locking bar when moved to its second position;
    (f) said locking bar being further mounted for limited axial horizontal movement between a first and a second position and so that said transversely extending members are approximately aligned with said slots when said locking bar is in the first position and misaligned when said locking bar is in the second position;
    (g) said slots being formed so that movement of one of said actuators from the first to the second position moves said locking bar from the first to the second position whereby movement of a second actuator into the second position is prevented;
    (h) spring means biasing said locking bar into the first position;
    (i) a plurality of idler pulleys rotatably mounted and connected to said motive means and said pair of shafts for causing one of said shafts to be driven where at least one of said idler pulleys is in an engaged position and for causing the other of said shafts to be driven when the remainder of said idler pulleys are in an engaged position; and
    (j) means linking said actuators to said idler pulleys for moving predetermined pulleys to the engage position when a selected actuator is moved to the second position.

3. In recording apparatus having a pair of rotatably mounted shafts adapted to receive reels thereon utilized alternatively and simultaneously as takeup and supply reels for a recording carrier, a driving capstan and motive means, apparatus for selectively connecting said motive means to said shafts comprising:
    (a) a control panel;
    (b) a plurality of mechanical actuators each having a protruding portion and a transversely extending member attached thereto;
    (c) a mechanical arrester having a transversely extending member attached thereto;
    (d) means mounting each of said actuators and said arrester on said control panel for individual parallel, axial slidable movement between a first and a second position and spring biased to the first positions;
    (e) a locking bar having a plurality of lateral slots therein mounted so its longitudinal axis is substantially perpendicular to the direction of movement of said actuators and said arrester for engaging said protruding portion when one of said actuators is moved to the second position and maintaining said one actuator in the second position, said arrester disengaging said protruding portion from said locking bar when moved to its second position;
    (f) said locking bar being further mounted for limited axial horizontal movement between a first and a second position and so that said transversely extending members are approximately aligned with said slots when said locking bar is in the first position and misaligned when said locking bar is in the second position;
(g) said slots being formed so that movement of one of said actuators from the first to the second position moves said locking bar from the first to the second position whereby movement of a second actuator into the second position is prevented;
(h) spring means biasing said locking bar into the first position;
(i) braking means movably mounted in juxtaposition with said shafts and having a first position not in contact with said shafts and a second position in contact with said shafts for stopping the rotation thereof;
(j) linking means connecting said actuators with said braking means for moving said braking means to said second position when said actuators are in said first position and for moving said braking means to said first position when any of said actuators are in said second position;
(k) a plurality of idler pulleys rotatably mounted and connected to said motive means and said pair of shafts for causing one of said shafts to be driven when at least one of said idler pulleys is in an engaged position and for causing the other of said shafts to be driven when the remainder of said idler pulleys are in an engaged position; and
(l) means linking said actuators to said idler pulleys for moving predetermined pulleys to the engage position when selected actuators are moved to the second position.

4. In recording apparatus having a pair of rotatably mounted shafts adapted to receive reels thereon utilized alternatively and simultaneously as takeup and supply reels for a recording carrier, a driving capstan and motive means, the improvement in control apparatus comprising:
(a) a control panel;
(b) a plurality of mechanical actuators each having at least a first and a second position and a protruding portion thereon;
(c) a mechanical arrester having a first and second position;
(d) means mounting said actuators and said arrester on said control panel for parallel, slidable movement between said first and said second positions and spring biased to the first position;
(e) locking means comprising
(1) a locking bar having a first and second position mounted so its longitudinal axis is substantially perpendicular to the direction of movement of said actuators and said arrester,
(2) a plurality of lateral slots having one side slanted to form a somewhat triangular shape located in said locking bar parallel to the movement of said actuators and said arrester and aligned therewith when said locking bar is in the first position for sliding engagement with said actuators when said actuators are moved to the second position, said slot being further located so as to be misaligned with said actuators when said locking bar is in the second position, and
(3) biasing means for normally holding said locking bar in said first position, one of said actuators moving said locking bar into the second position when it slidably engages one of said lateral slots upon being moved into its second position, said locking bar engaging said protruding portion of said actuator moved into the second position thereby maintaining said actuator in the second position and simultaneously said locking bar being displaced to its second position to prevent engagement of any of the remainder of the actuators with said lateral slots; and
(f) means linking said actuators to said motive means for selectively connecting said motive means to one of said shafts when a selected actuator is in the second position.

References Cited

UNITED STATES PATENTS

| | | | |
|---|---|---|---|
| 2,991,660 | 7/1961 | Mihaila | 74—190 |
| 3,138,031 | 6/1964 | Brualdi | 74—190 |
| 3,160,022 | 12/1964 | Dvorin | 74—190 |
| 3,286,898 | 11/1966 | Walker | 226—188 |
| 2,676,212 | 4/1954 | Williams | 242—55.12 X |
| 2,927,743 | 3/1960 | Shatavsky | 242—55.12 |
| 2,985,395 | 5/1961 | Hoehn et al. | 242—55.12 |
| 3,050,225 | 8/1962 | Ulman | 242—55.12 X |

GEORGE F. MAUTZ, *Primary Examiner.*